(12) United States Patent
Zils

(10) Patent No.: US 11,276,950 B2
(45) Date of Patent: Mar. 15, 2022

(54) MOUNTING DEVICE WITH A HEATING DEVICE FOR RECEIVING AT LEAST ONE PREPARATION VESSEL FOR FOOD

(71) Applicant: VORWERK & CO. INTERHOLDING GMBH, Wuppertal (DE)

(72) Inventor: Jürgen Zils, Burscheid (DE)

(73) Assignee: VORWERK & CO. INTERHOLDING GMBH, Wuppertal (DE)

( * ) Notice: Subject to any disclaimer, the term of this patent is extended or adjusted under 35 U.S.C. 154(b) by 99 days.

(21) Appl. No.: 16/801,572

(22) Filed: Feb. 26, 2020

(65) Prior Publication Data

US 2020/0343662 A1    Oct. 29, 2020

(30) Foreign Application Priority Data

Feb. 27, 2019    (EP) .................................... 19159702

(51) Int. Cl.
*H01R 13/10*    (2006.01)
*A47J 43/07*    (2006.01)
*A47J 27/21*    (2006.01)

(52) U.S. Cl.
CPC .......... *H01R 13/10* (2013.01); *A47J 43/0722* (2013.01); *A47J 27/21008* (2013.01)

(58) Field of Classification Search
CPC .. A47J 43/0766; A47J 36/34; A47J 27/21008; H01R 13/10
See application file for complete search history.

(56) References Cited

U.S. PATENT DOCUMENTS 6,884,083 B2    4/2005    Shepherd

FOREIGN PATENT DOCUMENTS

| DE | 102010016090 A1 * | 9/2011 | .......... A47J 43/0716 |
|---|---|---|---|
| EP | 0498056 A1 | 8/1992 | |
| EP | 1253679 A2 | 10/2002 | |
| EP | 1676507 A2 | 7/2006 | |
| EP | 2454980 A1 | 5/2012 | |

OTHER PUBLICATIONS

European Patent Search Report of EP 19 15 9702, dated Jun. 28, 2019.

* cited by examiner

*Primary Examiner* — Briggitte R. Hammond
(74) *Attorney, Agent, or Firm* — Dickinson Wright PLLC

(57) ABSTRACT

A mounting device (1) for receiving at least one preparation vessel (2) for food with a heating device having at least one receiving portion (4) for the preparation vessel (2) and at least three contact sockets (5a, 5b, 5c, 5d, 5e) for at least partially receiving corresponding contact pins (6a, 6b, 6c) on the preparation vessel (2). A mounting device (1) for receiving at least one preparation vessel (2) for food with a heating device, in which the user safety is improved, is realized in that at least one first of the contact sockets (5c) including at least one signaling means (8), that the signaling means (8) generates at least one insertion signal when one of the contact pins (6b) is inserted at least partially into the first contact socket (5c), that when the insertion signal is present, at least one other of the contact sockets (5a, 5b, 5d, 5e) can be supplied with a working voltage, and that without the insertion signal being present, none of the contact sockets (5a, 5b, 5c, 5d, 5e) can be supplied with a working voltage.

16 Claims, 3 Drawing Sheets

MOUNTING DEVICE WITH A HEATING DEVICE FOR RECEIVING AT LEAST ONE PREPARATION VESSEL FOR FOOD

CROSS-REFERENCE TO RELATED APPLICATIONS

This application claims the benefit of priority under 35 U.S.C. § 119 to European Patent Application No. 19159702.0, filed Feb. 27, 2019, the contents of which are incorporated herein by reference in their entirety.

FIELD OF THE INVENTION

The invention relates to a mounting device with a heating device for receiving at least one preparation vessel for food. The mounting device comprises at least one receiving portion for the preparation vessel and at least three contact sockets for at least partially receiving corresponding contact pins on the preparation vessel. The contact sockets serve in particular for electrical connecting at least to the heating device, preferably to additional electrical functions, of the preparation vessel when the preparation vessel is inserted into the mounting device.

Furthermore, the invention relates to a mounting station as well as to a kitchen appliance with a mounting device according to the invention.

BACKGROUND

A mounting device for a preparation vessel for food with a heating device is known, for example, from DE 10 2010 016 090 A1. The disclosed mounting device comprises a receiving socket and contacts a heating device of the food preparation vessel with electrical contact sockets when it is installed into the receiving socket. The mounting device serves, for example, to keep food warm that is present in the preparation vessel and processed in a separate step with a kitchen appliance.

According to the teaching of the aforementioned publication, the electrical contact sockets of the receiving socket are covered in a non-use position of the receiving socket, wherein the covering can be penetrated by the opposing electrical contacts of the preparation vessel in order to establish an electrical connection.

However, the electrical contact sockets of the receiving socket are always supplied with a working voltage or at least can always be supplied with a working voltage. Thus, there is basically a risk of possible injury due to an electric shock if a user introduces an electrically conducting object into one of the contact sockets when the preparation vessel is not present.

Based on the prior art described above, the object of the invention is thus to provide a mounting device for receiving at least one preparation vessel for food with a heating device in which the user safety is improved.

SUMMARY AND INTRODUCTORY DESCRIPTION OF EMBODIMENTS OF THE INVENTION

The object mentioned above is solved according to an embodiment of the present invention for a generic mounting device in that at least one first of the contact sockets comprises at least one signaling means, and that the signaling means generates at least one insertion signal when one of the contact pins of a preparation vessel, or also any other conducting or non-conducting object, is inserted at least partially into the first contact socket. At least one other of the contact sockets, preferably at least two other contact sockets, is/are supplied or can be supplied with a working voltage only at the time when an insertion signal is present. If no insertion signal is present, none of the contact sockets can be supplied with a working voltage.

The mounting device is formed for at least partially receiving a preparation vessel. The receiving portion for the preparation vessel, preferably with respect to its shape, is formed to basically correspond to a base portion of the preparation vessel for at least partially receiving the preparation vessel in a form-fit manner. Upon introduction of the preparation vessel into the receiving portion, simultaneously all contact pins are inserted into the contact sockets and the electric operational elements, for example a heating device or thermocouples, are electrically connected.

To improve user safety, the invention provides that at least one other of the contact sockets is supplied with a working voltage or will be supplied with a working voltage only when an insertion signal is present for the contact socket with the signaling means. For example, the mounting device has a controller which responds to the presence of at least one insertion signal, or rather controls the electrical contacting of the contact sockets depending on the presence or absence of an insertion signal. The insertion signal can control, for example, a relay circuit or transistor circuit in order to facilitate that one or a plurality of contact sockets can be supplied with a working voltage.

When the insertion signal is present, a working voltage is not in every case directly supplied to one of the other contact sockets. By means of the insertion signal, the respective contact socket is only enabled for operation, for example by a controller. The supply with a working voltage may depend on additional switching processes initiated by the user. If no insertion signal is present, then none of the contact sockets can be supplied with a working voltage at all.

The signaling means is formed and configured preferably such that it can be used at least indirectly to detect the presence of a contact pin or of another object in the contact socket with the signaling means. For example, the signaling means comprises at least one electrically conducting signal contact in the contact socket whose contact with a conducting contact pin can generate an insertion signal. Alternatively, it is provided for that the signaling means comprises at least two electrically conducting signaling contacts in the contact socket, between which a conducting contact is produced, at least by means of a conducting section of a contact pin, so that the insertion signal is generated.

It is also provided that the signaling means comprises at least one switch, in particular a rocker switch, toggle switch or magnet switch, for generation of the insertion signal. The signaling means is formed and configured to determine the presence of a contact pin or of any other object in the contact socket.

The signaling means consequently serves to enable a working voltage for at least one of the other contact sockets, preferably all other contact sockets, or rather to supply them with a working voltage directly.

In comparison to the prior art, the present invention has the advantage that the risk of an electric shock upon insertion of a conductive object into one of the contact sockets is reduced, because by the insertion into the contact socket with the signaling means only the working voltage in at least one of the other contact sockets get enabled.

According to an alternative embodiment of the mounting device in accordance with the present invention, the object described above is solved in that at least two of the contact sockets each comprise at least one signaling means, and that the signaling means generate at least one insertion signal when simultaneously each one of the contact pins is inserted at least partly into each of the two contact sockets. Preferably, a common insertion signal will be generated only when simultaneously at least one contact pin is respectively inserted into both contact sockets. But it is also provided that each of the signaling means generates a separate insertion signal.

In case of a common insertion signal for both contact sockets with signaling means, when the insertion signal is present at least one of the two contact sockets, preferably at least both contact sockets, can be supplied with a working voltage. In case of separate insertion signals, both insertion signals must be present simultaneously for enabling the working voltage. Without an insertion signal for the common insertion signal, or respectively without both insertion signals for separate insertion signals, none of the contact sockets can be supplied with the working voltage.

Consequently, the contact socket, or respectively the contact sockets, can only be supplied with a working voltage when a contact pin or another object is simultaneously inserted into both contact sockets. In particular, none of the contact sockets can be supplied with a working voltage when an object is introduced only into one of the two contact sockets.

An embodiment of this kind is particularly advantageous when the two contact sockets are the contact sockets which supply for example an electric operational element, such as the heating device, with a working voltage. However, it is also provided that one of the two contact sockets with signaling means is connected to a ground contact and one of the two contact sockets can be supplied with a working voltage.

The invention provides that at least the two contact sockets with signaling means are electrically connected to a ground contact at least until the insertion signal or respectively both insertion signals are present. The electrical interconnection of the contact sockets will be changed when indicated, for example by a controller, only in case the condition; namely, the at least partial and simultaneous insertion of two contact pins into two contact sockets is met.

The invention also provides that a signaling means is arranged in all contact sockets, and that the supply with a working voltage is only possible at the time when a common insertion signal or respective separate insertion signals are present for all contact sockets.

This embodiment of the mounting device enhances the user safety, because simultaneously two objects, in particular contact pins, need to be inserted in order to enable the working state of the contact sockets. Usually this will occur only when in fact a preparation vessel with the required number of contact pins is set into position and all contact pins penetrate simultaneously into the required contact sockets.

One particularly preferred exemplary embodiment of the mounting device provides that the first contact socket is always electrically connected to a ground contact. Consequently, it is a grounded contact socket.

It is provided for that a signaling means is disposed only in this contact socket, so that at least one further contact socket, preferably all further contact sockets, can be supplied with a working voltage when an insertion signal is present in the grounded contact socket.

If a conducting object, which may not be a contact pin for example, is inserted into the first contact socket, then a user would be electrically connected only to the ground. In such a case, it would not be hazardous for the user that the other contact sockets then can be supplied with a working voltage. If the conducting object would be inserted into one of the other contact sockets, without an insertion signal being present for the first contact socket, the grounded contact socket, then these sockets cannot be supplied with a working voltage.

This exemplary embodiment has the advantage that with a single signaling means in a single contact socket, a very dependable safety is assured for the user against an electric shock.

The level of safety for a user can be increased in particular in that it is provided according to a further embodiment that an insertion signal is only generated at a predetermined depth of penetration of the contact pin. Consequently, an insertion signal will be generated only when the contact pin has reached the predetermined depth of penetration. Penetration depths of between 10% and 75%, in particular 50%, of the total depth of the contact socket have proven to be advantageous. Further, preferred penetration depths for generation of the insertion signal are between 4 mm and 12 mm, especially 4 mm, 6 mm, 7 mm, 8 mm, 10 mm or 12 mm. The depth of penetration is measured starting from an inlet opening of the contact chamber for a contact pin.

Due to the predetermined penetration depth it can also be ensured that the electric operational elements, e.g. the heating device, in a preparation vessel can only be switched on, that is supplied with a working voltage, when the preparation vessel has been properly placed into the receiving portion or respectively is in a position shortly before this.

The mounting device is further characterized according to another embodiment of the present invention in that the signaling means comprises at least one switching element, for example, a microswitch or a magnet switch, in particular a reed contact. The switching element preferably has two switching states, namely a switching state in which no insertion signal is generated, and a switching state in which an insertion signal is generated. Preferably, the switching path of the switching element is about 1 mm. The depth of penetration of a contact pin into the contact chamber for actuation of the switching element amounts to between 4 mm and 12 mm, for example, as described above.

The insertion signal can control, for example, a relay circuit or transistor circuit in order to enable one or a plurality of contact sockets for supply with a working voltage. It is also provided for that the insertion signal is evaluated by a controller. The switching element, for example, is actuated directly by a contact pin inserted in a contact socket.

In particular, the constructional implementation is simplified in that it is provided according to one embodiment that the signaling means comprises an actuating element movably held in the contact socket, and that the insertion signal can be generated at least indirectly by the actuating element. The actuating element, for example, is a pin movably held within the contact socket, the pin being movably disposed beneath the electrical contact carriers of the contact socket.

If a contact pin of a preparation vessel is inserted into the contact socket, then the actuating element will be displaced by the contact pin, in particular linearly or circularly, and due to this displacement the insertion signal will be generated, preferably directly or indirectly. The actuating element is movably held preferably between a starting position and an actuation position, wherein in the starting position no insertion signal is present, and in the actuation position an insertion signal is present. Preferably, the actuating element, in particular when in the actuation position, actuates an electrical switching element in order to generate the insertion signal.

The predetermined penetration depth of a contact pin at which the insertion signal is generated can be defined by means of the length of the actuating element and/or the extension of the actuating element in the contact socket, in particular starting from the side opposite the insertion opening for a contact pin, and the covered distance between the starting position and actuation position.

The actuating element is made in particular from a non-conducting material, for example plastic, in order to prevent the transmission of electric currents. It is also provided for that the actuating element comprises at least one conductive contact region or conductive contact regions in order to establish a conducting connection between two electrical conducting switch contacts, or to contact an electrical conducting switch contact for generation of the insertion signal in a particular position.

Assembly of the mounting device can be simplified according to a further embodiment in particular in that the actuating element is guided in a switch housing, and that the switch housing is float mounted, in particular in a housing of the mounting device. Advantageously, the switch housing is formed of at least two parts.

Preferably, the actuating element is movably retained in the switch housing and is guided at least partly by the switch housing. Preferably, the actuating element is movably retained between a starting position and an actuating position. In particular, the actuating element extends at least partly from the switch housing.

For assembly purposes, it has proven to be advantageous to design the switch housing from at least two parts. Preferably, the actuating element is inserted from an insertion direction into a first housing part of the switch housing and emerges from the switch housing at the opposite side through a corresponding opening. From the assembly direction, the switch housing is closed with a second housing part, and the two housing parts are snapped together, for example.

Because the actuating element is guided in the separate switch housing, the switch housing can be arranged relative to a contact region with the contact sockets and float mounted, for example, in the housing of the mounting device. Preferably, also the housing of the mounting device consists of at least two parts which are joined together, wherein the contact retainer with the contact sockets and the switch housing are arranged, preferably float mounted, between the two joined parts.

Especially in the case of the float mounting, it has proven to be advantageous according to another embodiment when it is provided for that a contact retainer which comprises the contact sockets, and the switch housing are aligned to each other by means of the actuating element, in particular are held in their positions with respect to each other. For example, the actuating element on one side of the switch housing extends at least partly out of the switch housing. Now if the actuating element is inserted at least partly into a contact socket, then the contact retainer and the switch housing are joined to each other or respectively are aligned relative to each other by means of the actuating element.

A further embodiment of the mounting device provides that a resetting means acts on the actuating element, preferably that the resetting means always exerts a force on the actuating element in the direction of a starting position. The resetting element acts advantageously on the actuating element such that the actuating element is always pushed into a starting position in which no insertion signal is generated. The resetting element always ensures that the supply with the working voltage is not enabled for several, preferably for all, contact sockets. For example, the resetting means comprises at least one spring and/or at least one magnet with which the actuating element is forced into the starting position, or respectively, which forces the actuating element into the starting position.

In particular, so as to implement additional electrical functionality for the preparation vessel, it is provided according to another embodiment of the mounting device in accordance with the present invention that at least five contact sockets are formed. Preferably, one contact socket serves for contacting of a ground contact, two contact sockets serve for contacting of the electric heating device, in particular of a resistance heating device, and two other contacts serve for contacting of additional signals, especially for contacting of at least one thermocouple arranged in the base of the preparation vessel.

The object of the invention stated above is furthermore solved with a kitchen appliance that comprises at least one mounting device, a power supply and at least one motor to drive a rotating tool in a preparation vessel, as well as in particular a controller for at least partly automatic handling of a preparation program. The mounting device in the kitchen appliance is configured in accordance with one of the exemplary embodiments described above.

In addition, the object stated above is solved with a socket station for a preparation vessel for food with a heating device in which the mounting device is configured according to one of the exemplary embodiments described above.

In accordance with a first embodiment of the socket station, it is preferably provided that the mounting device comprises at least one mechanical interface for driving a rotating tool, e.g. a mixer, crusher and/or stirring unit, in the preparation vessel. The mounting device in particular comprises at least one motor with which the mechanical interface can be driven. The socket station can then be used both to keep food located in the preparation vessel warm, and also for stirring, in order to prevent burning, for instance.

An embodiment of the socket station further provides that the socket station comprises a separate power supply. Due to its own power supply, the socket station can be operated independently.

BRIEF DESCRIPTION OF THE DRAWINGS

Further favorable embodiments of the invention are presented in the following description of figures and in the dependent claims. The figures show:

The same parts in the various figures of the drawing are always denoted by the same reference symbols.

DETAILED DESCRIPTION

With regard to the following description it is claimed that the invention is not limited to the exemplary embodiments and in this regard not to all or a plurality of features of described feature combinations, rather each individual part feature of the/each embodiment is of importance to the subject matter of the invention, also separated from all other partial features described in connection therewith, and also in combination with any other features of another embodiment.

Figure 1:
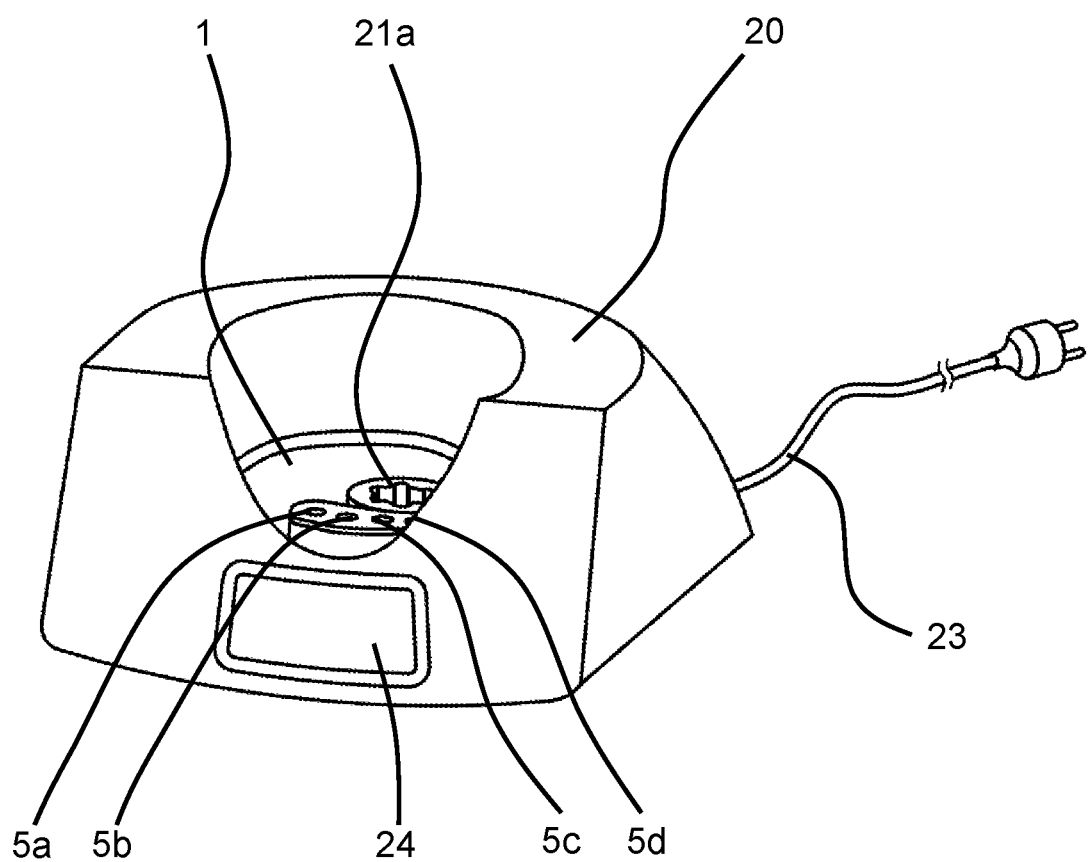
FIG. 1 shows an exemplary embodiment of a mounting device in a mounting station in a perspective view.

FIG. 1 depicts an exemplary embodiment of a mounting device 1 for receiving at least one preparation vessel 2 (depicted in FIG. 2) for food, with a heating device. The mounting device 1 is arranged on a mounting station 20.

Figure 3:
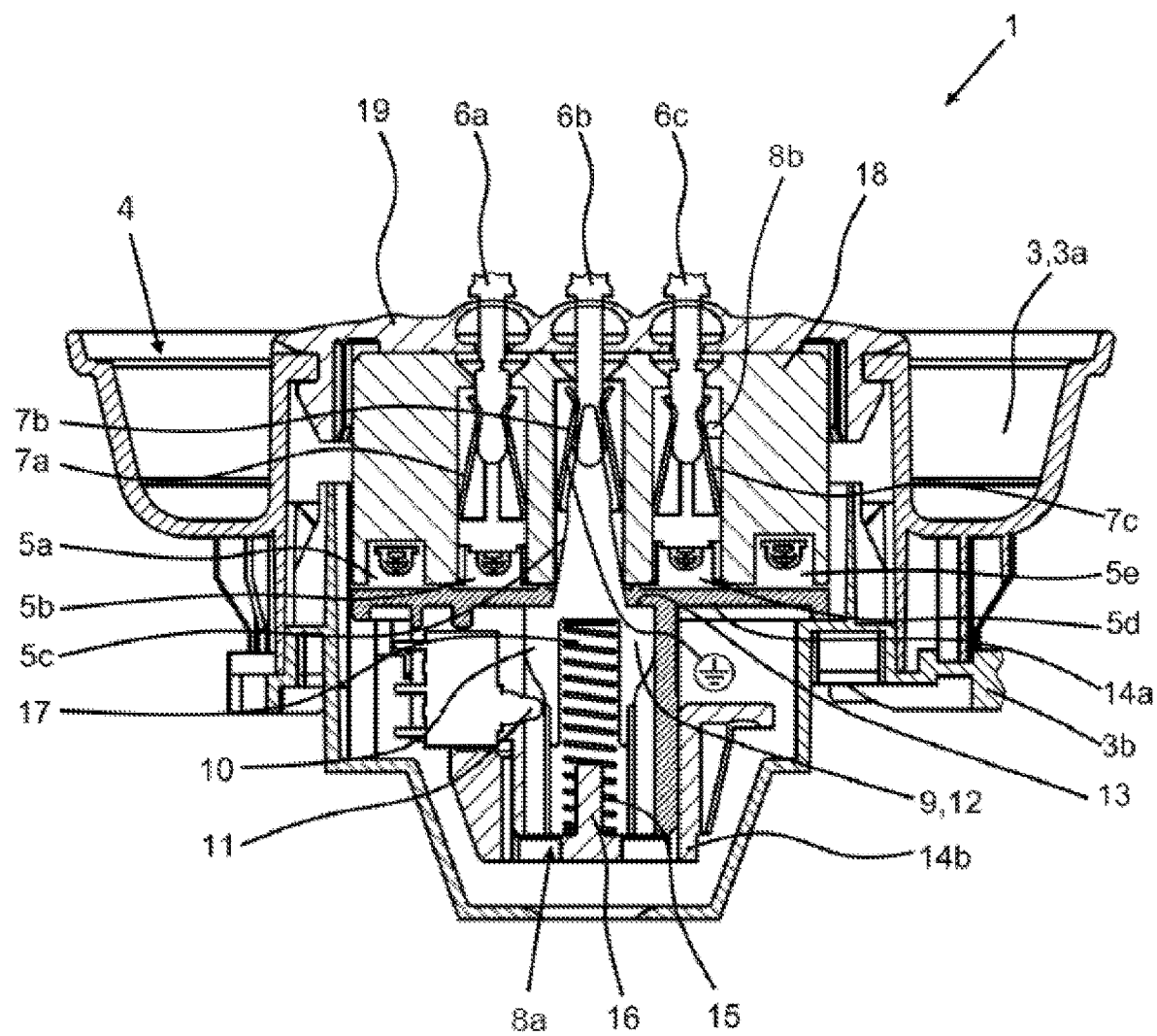
FIG. 3 shows a mounting device in a partial cross sectional view.

FIG. 3 depicts an exemplary embodiment of a mounting device 1 according to FIG. 1 in an at least partial cross sectional view. The mounting device 1 comprises at least one housing 3, which in this example has a two-part design, namely a first housing part 3a and a second housing part 3b, which are joined together. In particular, the first housing part 3a and the second housing part 3b are joined in a form-fit and/or force-fit manner, in particular force-form-fitted.

The housing 3, in particular the first housing part 3a, comprises a receiving portion 4 for the preparation vessel 2 which is designed in particular to correspond to a bottom part of a preparation vessel 2. The mounting device 1 according to FIG. 1 and FIG. 3 comprises five contact sockets 5a, 5b, 5c, 5d, 5e for receiving corresponding contact pins 6a, 6b, 6c of the preparation vessel 2. The contact sockets 5a, 5b, 5c, 5d, 5e and the contact pins 6a, 6b, 6c serve inter alia for electric connection of the heating device in the preparation vessel 2. In the cross-sectional view of FIG. 3, only three of in total five present contact pins 6a, 6b, 6c are shown.

Figure 2:
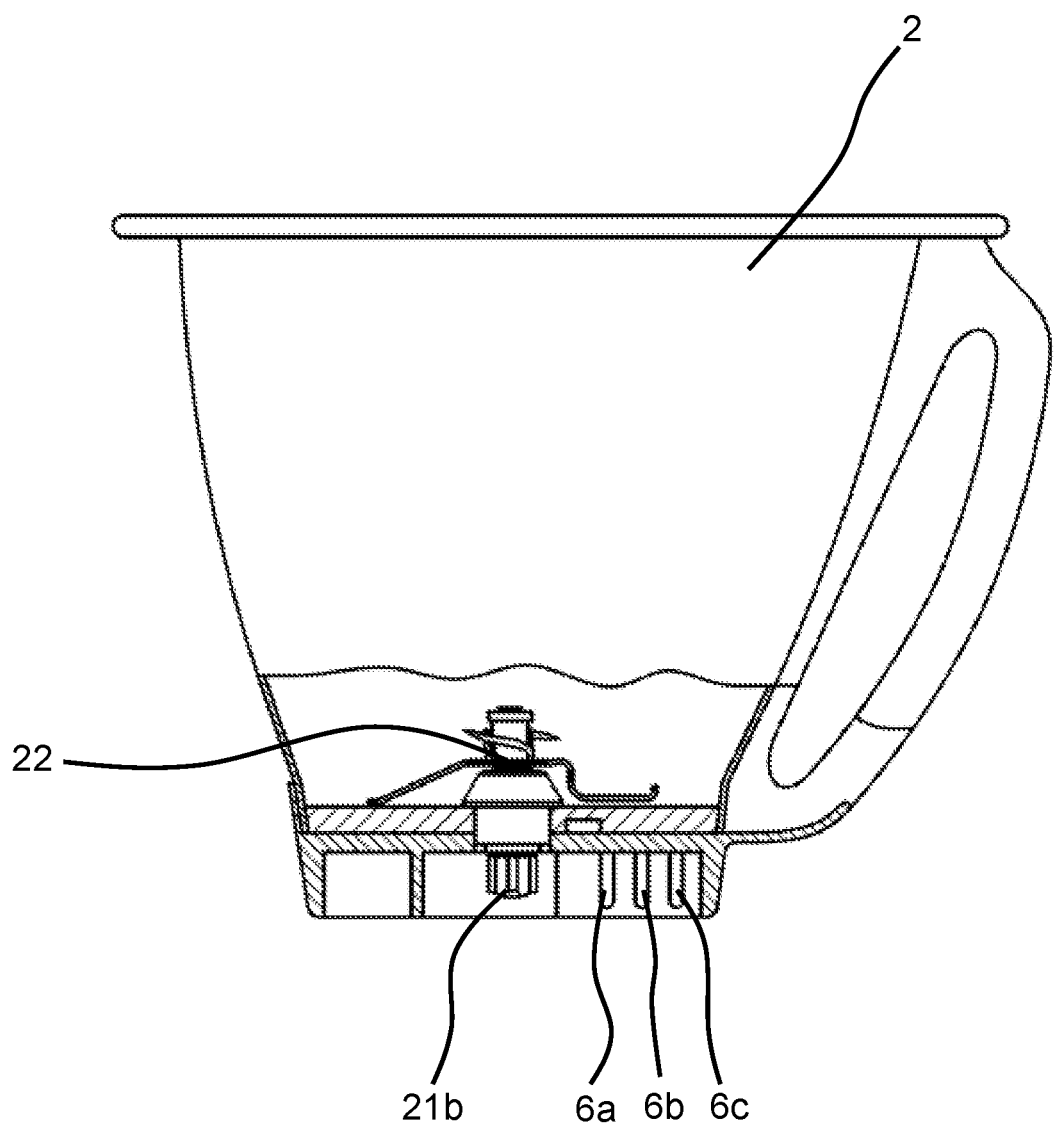
FIG. 2 shows an exemplary embodiment of a preparation vessel for use with a mounting device in a partial cross sectional side view.

When setting a preparation vessel 2 according to FIG. 2 into a mounting device 1 according to FIG. 1 and FIG. 3, in particular into the receiving portion 4, the contact pins 6a, 6b, 6c are automatically received within the contact sockets 5b, 5c, 5d and electrically contacted. For electrical contacting, each contact socket 5a, 5b, 5c, 5d, 5e comprises at least one grid-like contact support 7a, 7b, 7c. The contact supports 7a, 7b, 7c encompass an inserted contact pin 6a, 6b, 6c at its circumference and thus establish an electrical connection.

A first one of the contact sockets 5c comprises a signaling means 8a for generating at least one insertion signal when a contact pin 6b has been at least partly inserted into the first contact socket 5c. The mounting device 1 furthermore comprises means, for example a controller and/or a relay circuit, which are formed and configured to ensure that the other contact sockets 5a, 5b, 5d, 5e can each be supplied with a working voltage only when an insertion signal is present at least for the first contact socket 5c.

According to the exemplary embodiment of a mounting device 1 shown in FIG. 1 and FIG. 3, the first contact socket 5c is permanently connected to a ground contact. It is ensured that the other contact sockets 5a, 5b, 5d, 5e can be supplied with a working voltage only at the time when one contact pin 6b has been inserted sufficiently deep into the first contact socket 5c. Thereby, on the one hand, a detection of the preparation vessel is implemented, and at the same time, it is ensured that a user will not be exposed to any working voltage upon insertion of conductive objects other than the contact pins 6a, 6b, 6c into the contact sockets 5a, 5b, 5c, 5d, 5e.

In the exemplary embodiment according to FIG. 3, the signaling means 8a comprises an actuation element 9 movably mounted in the first contact socket 5c. The actuation element 9 is movable between a starting position illustrated in FIG. 3, and an actuation position (not illustrated). In the actuation position, the actuating element 9 by means of a switching flank 10 actuates a switching element 11 which is designed as a microswitch in this exemplary embodiment.

By using the microswitch 11, a relay circuit, not further shown, is actuated, by means of which the other contact sockets 5a, 5b, 5d, 5e can be enabled for supply with a working voltage or can be supplied with a working voltage. As an alternative, the signaling means comprises at least one electrically conducting signal contact in the contact socket whose contact with a conducting contact pin can generate an insertion signal shown in FIG. 3 as signaling means 8b.

According to FIG. 3, the actuating element 9 comprises a base body 12 which forms both, the switching flanks 10 as well as a perimeter contact surface 13. The contact surface 13 in the starting position rests against a two-part switch housing 14, which retains the actuating element 9 and the switching element 11. The switch housing 14 is of a two-part design and comprises a first housing part 14a and a second housing part 14b which are joined together. The switch housing 14 is retained in a floating manner in the housing 3, in particular between the first housing part 3a and the second housing part 3b.

A generally conical protrusion extends from the base body 12 of the actuating element 9, extending from the switch housing 14 and into the first contact socket 5c. The actuating element 9 is held by a resetting means 15 in the depicted starting position. The resetting means 15 is braced against the second housing part 14b of the switch housing 14 and is held in position by a guide spindle 16. The resetting means 15 in the form of a spring penetrates into a corresponding recess 17 in the base body 12 of the actuating element 9 and is thereby guided.

If a contact pin 6b is inserted into the contact socket 5c, the contact pin 6b is initially contacted by the contact support 7b. In the further course, the contact pin 6b pushes the actuating element 9 downward against the force of the resetting means 15 being configured in form of a spring, and, after reaching the actuating position, actuates the microswitch 11 to enable the supply with an operating voltage for the other contact sockets 5a, 5b, 5d, 5e. The contact sockets 5a, 5b, 5c, 5d, 5e are formed and arranged in a contact retainer 18 which is likewise supported in a floating manner in the housing 3 between the first housing part 3a and the second housing part 3b.

The contact retainer 18, in particular the contact sockets 5a, 5b, 5c, 5d, 5e, are covered by a protective gasket 19 which prevents contaminants from entering into the contact sockets 5a, 5b, 5c, 5d, 5e, and can be penetrated by contact pins 6a, 6b, 6c. The contact pins 6a, 6b, 6c of a preparation vessel 2, for example according to FIG. 2, are inserted according to FIG. 3 into the contact sockets 5b, 5c, 5d by means of inserting the preparation vessel 2 into the receiving portion 4.

It is particularly preferred that the mounting device 1, as shown in FIG. 1, is formed with a heating device as part of a mounting station 20 for a preparation vessel 2 for food. Thus, in the mounting station 20, a preparation vessel 2 according to FIG. 2 can be received and electrically contacted. In addition to the contact sockets 5a, 5b, 5c, 5d, 5e for electrical contacting, the mounting device 1 comprises at least one mechanical interface 21a for driving a rotating tool 22 (shown in FIG. 2) in the preparation vessel 2. The preparation vessel 2 comprises a corresponding mechanical interface 21b. In this exemplary embodiment, the mechanical interface 21b on the preparation vessel 2 is generally designed as a hex-head protrusion and the mechanical interface 21a at the socket station 20 is designed as a hex-head socket.

By means of the mechanical interfaces 21a, 21b, the rotating tool 22 can be driven as well as using the contacting means 5 the heating device can be operated, when the preparation vessel 2 installed. In this manner, by means of the mounting station 20 food prepared in the preparation vessel 2 can be kept warm and by stirring prevented from burning. Preferably, the mounting station 20 comprises a, (not illustrated) controller that is able to control the heating device and the rotating tool 22 as needed. In addition, the mounting station 20 comprises a separate power supply 23 and an operating means 24, here in the form of a touch panel. The operating means 24 is used at least indirectly to actuate the heating device or the motor, for example.

The invention is not limited to the illustrated and described embodiments, but rather includes also all embodiments which are equivalent within the sense of the invention. It is explicitly pointed out that the exemplary embodiments are not limited to all features in combination, rather, each individual part feature can by itself also have inventive significance even detached from all other part features. Furthermore, the invention is also not limited to the combination of features, but rather can also be defined by any other combination of particular features of all the disclosed individual features. This means that basically virtually each individual described feature can be omitted or respectively replaced by at least one individual feature disclosed elsewhere in the application.

While the above description constitutes the preferred embodiment of the present invention, it will be appreciated that the invention is susceptible to modification, variation and change without departing from the proper scope and fair meaning of the accompanying claims.

The invention claimed is:

1. A mounting device for receiving a preparation vessel for food with a heating device, comprising at least one receiving portion for the preparation vessel and at least three contact sockets for at least partially receiving corresponding contact pins on the preparation vessel, at least a first of the contact sockets comprises a signaling means for generating at least one insertion signal when one of the contact pins is inserted at least partially into the first contact socket, that when the insertion signal is present, at least one other of the contact sockets are supplied with a working voltage, and that without the insertion signal being present, none of the contact sockets can be supplied with the working voltage, wherein the first of the contact sockets is permanently electrically connected to a ground contact.

2. The mounting device according to claim 1 wherein, at least two of the contact sockets respectively comprise the signaling means, that the signaling means generates the insertion signal when each one of the contact pins is simultaneously inserted at least partially into each of the two contact sockets.

3. The mounting device according to claim 1 further comprising, the insertion signal is generated for a predetermined depth of penetration of at least one of the contact pins into at least one of the contact sockets at a depth of penetration of between 10% and 75% of a total depth of a contact socket.

4. The mounting device according to claim 1 wherein, the signaling means comprises at least one electrical switching element.

5. The mounting device according to claim 1 wherein, the signaling means comprises an actuating element movably retained in at least one of the contact sockets, and that the insertion signal can be generated at least indirectly by the actuating element.

6. The mounting device according to claim 5 further comprising, the actuating element is formed at least in part of a non-conducting material.

7. The mounting device according to claim 5 further comprising, the actuating element is guided in a switch housing, and that the switch housing is float mounted, and the switch housing is formed of at least two parts.

8. A mounting device according to claim 5 further comprising, a resetting means for acting on the actuating element.

9. The mounting device according to claim 7 further comprising, the switch housing and a contact retainer containing the contact sockets are aligned with the actuating element with respect to each other.

10. The mounting device according to claim 1 further comprising, at least five of the contact sockets are provided, a second of the contact sockets and a third of the contact sockets serve for connecting the heating device and a fourth of the contact sockets and a fifth of the contact sockets serve for connecting additional signals.

11. A kitchen appliance having the mounting device in accordance with claim 1 further comprising, at least one power supply and at least one motor for driving a rotating tool in the preparation vessel.

12. A mounting station having the mounting device in accordance with claim 1 further comprising, the heating device.

13. The mounting station according to claim 12 wherein, the mounting device further comprises, at least one mechanical interface for driving a rotating tool in the preparation vessel.

14. The mounting device according to claim 4 further comprising, the electrical switching element in the form of a microswitch or a magnet switch.

15. The mounting device according to claim 8 further comprising, the resetting means constantly exerts a force on the actuating element in the direction of a starting position, the resetting means comprises at least one of a spring or a magnet.

16. A mounting device for receiving at least one preparation vessel for food with a heating device, comprising at least one receiving portion for the preparation vessel and at least three contact sockets for at least partially receiving corresponding contact pins on the preparation vessel wherein, at least two of the contact sockets respectively comprise at least one signaling means, that the signaling means generates an insertion signal when each one of the contact pins is simultaneously inserted at least partially into each of the two contact sockets that when the insertion signal is present, at least one of the contact sockets can be supplied with a working voltage, and that without the insertion signal being present, none of the contact sockets can be supplied with a working voltage wherein one of the two contact sockets with signaling means is permanently electrically connected to a ground contact and one of the two contact sockets can be supplied with a working voltage.

* * * * *